United States Patent [19]

Suzuki et al.

[11] Patent Number: 5,096,413
[45] Date of Patent: Mar. 17, 1992

[54] IGNITION MECHANISM FOR A HEATER

[75] Inventors: Ryoichi Suzuki, Yokohama; Mitsuo Maiya, Tokyo; Motoo Kuwahara, Kamaishi; Kunio Yamauchi, Hikone; Choji Kawabata, Tatebayashi; Akira Takeuchi, Fukaya, all of Japan

[73] Assignee: Nissin Shokuhin Kabushiki Kaisha, Osaka, Japan

[21] Appl. No.: 413,100

[22] Filed: Sep. 27, 1989

[30] Foreign Application Priority Data

Sep. 30, 1988 [JP] Japan .................. 63-244365

[51] Int. Cl.⁵ ............................. F23Q 21/00
[52] U.S. Cl. ..................... 431/267; 126/367; 126/344; 126/263; 122/21
[58] Field of Search ............. 431/267, 269, 273; 126/263, 344, 367, 390, 391, 392, 360 R; 122/21; 432/224

[56] References Cited

U.S. PATENT DOCUMENTS

| | | |
|---|---|---|
| 2,020,292 | 11/1935 | Eggert et al. |
| 2,384,278 | 9/1945 | Caldwell ............. 126/263 X |
| 2,563,538 | 8/1951 | Lewis et al. ............. 431/269 |
| 2,896,607 | 7/1959 | Eder . |
| 3,072,190 | 1/1963 | Reichle ............. 166/58 X |
| 3,662,741 | 5/1972 | Licher . |
| 4,507,082 | 3/1985 | Wardlaw, III ............. 166/58 X |

FOREIGN PATENT DOCUMENTS

| | | |
|---|---|---|
| 586016 | 9/1933 | Fed. Rep. of Germany ...... 126/263 |
| 1952637 | 4/1971 | Fed. Rep. of Germany . |
| 3126518 | 9/1983 | Fed. Rep. of Germany . |
| 52-19358 | 2/1977 | Japan . |
| PCT/JP89/0-0293 | 3/1989 | Japan . |
| 579046 | 7/1946 | United Kingdom . |
| 581129 | 10/1946 | United Kingdom ............. 126/263 |

OTHER PUBLICATIONS

WO89/08804, Nippon Steel Corp., 21 Sep. 1989.

*Primary Examiner*—Carl D. Price
*Attorney, Agent, or Firm*—Marshall, O'Toole, Gerstein, Murray & Bicknell

[57] ABSTRACT

An ignition mechanism for a heater which includes a metal exothermic container in which are mounted an exothermic part, a firing part and an igniter. The igniter is a type which may be actuated by pushing or pulling a string. The mechanism comprises a tube mounted on the container, the tube having one end positioned adjacent the igniter. A string is connected to the igniter and extends into the tube, the string being extendable to the other end, whereby the string may be manually pulled or pushed and thereby operate the igniter. A float may be attached to the string, and a water-soluble glue may be provided to initially hold the string in place before use.

14 Claims, 3 Drawing Sheets

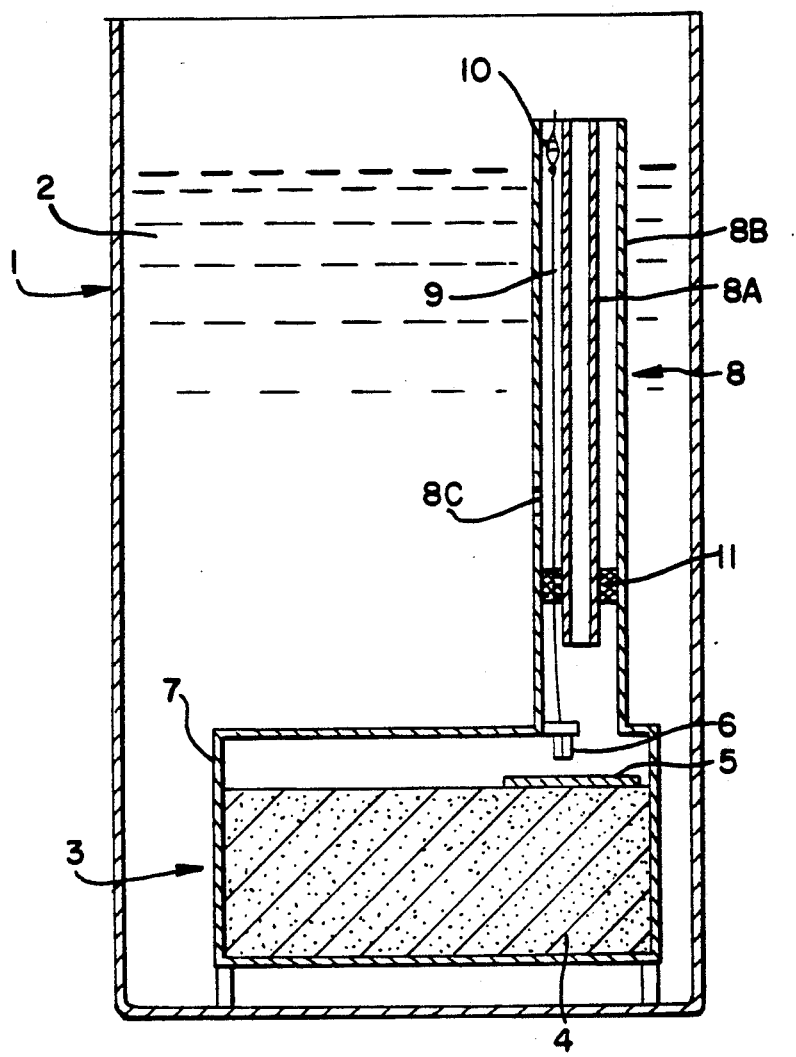
FIG_1a_
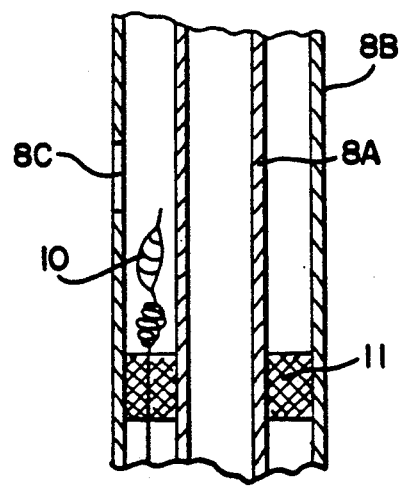
FIG_1b_

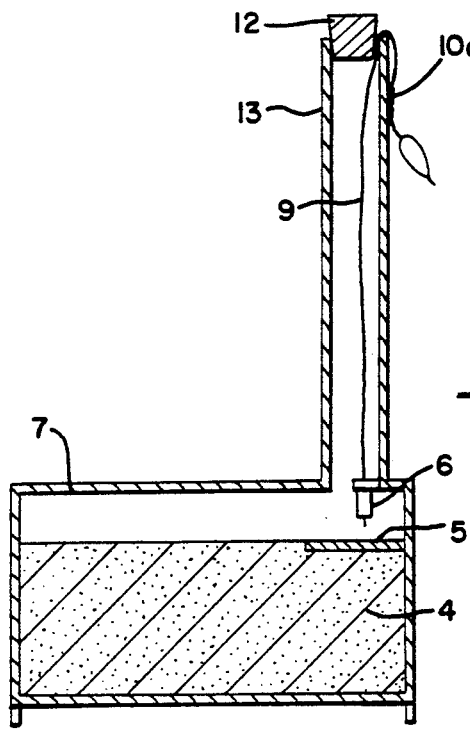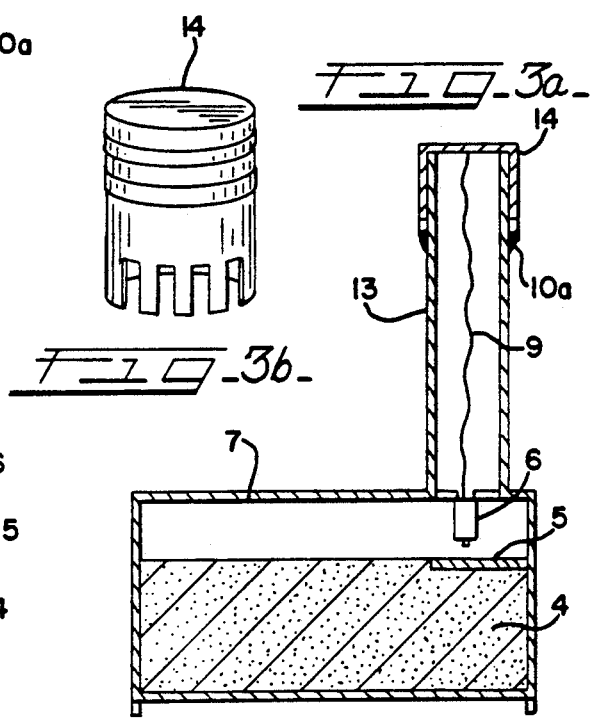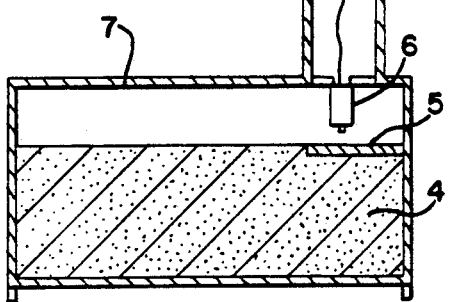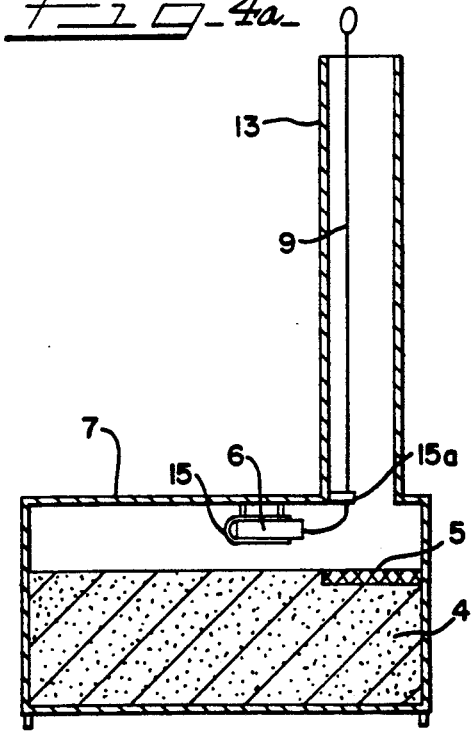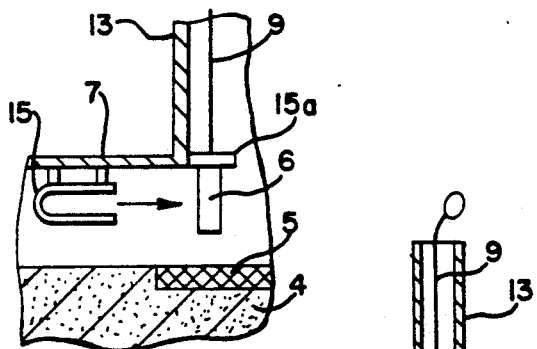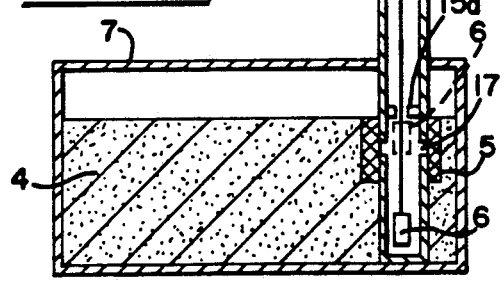

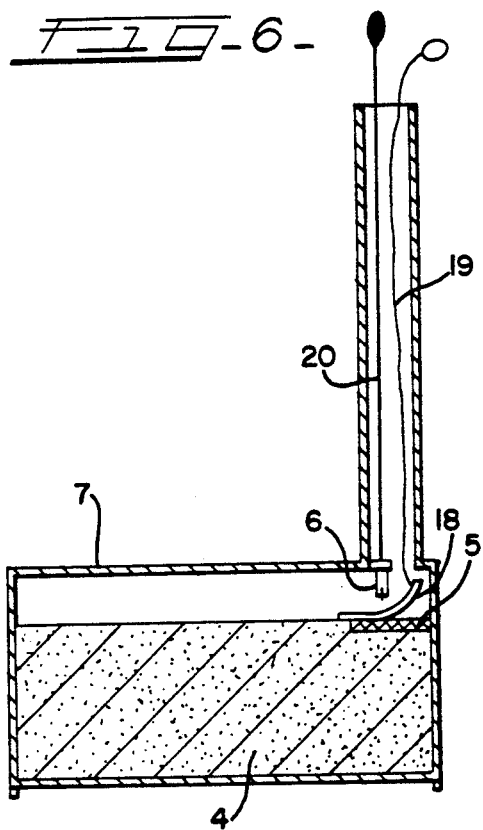
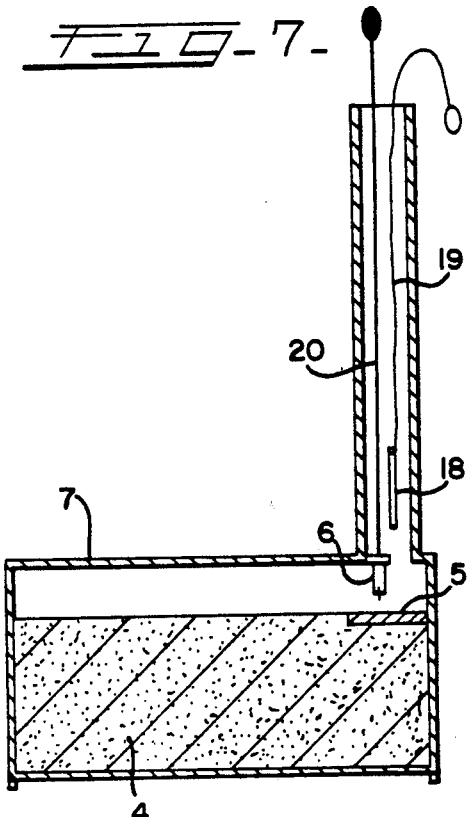
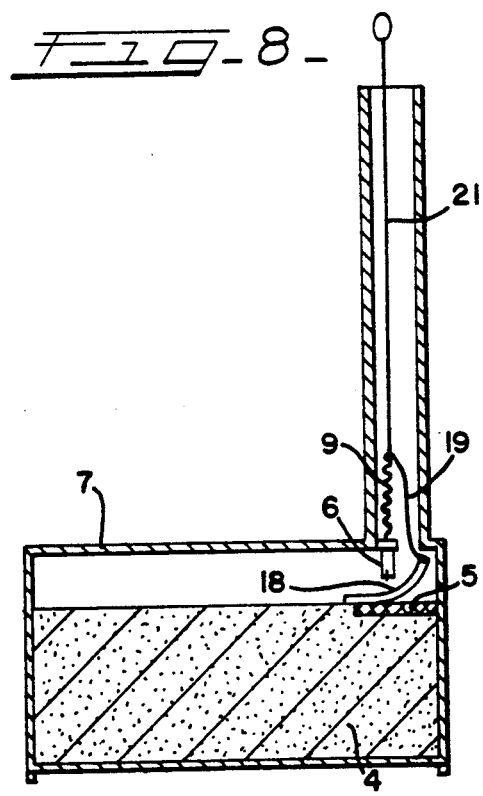
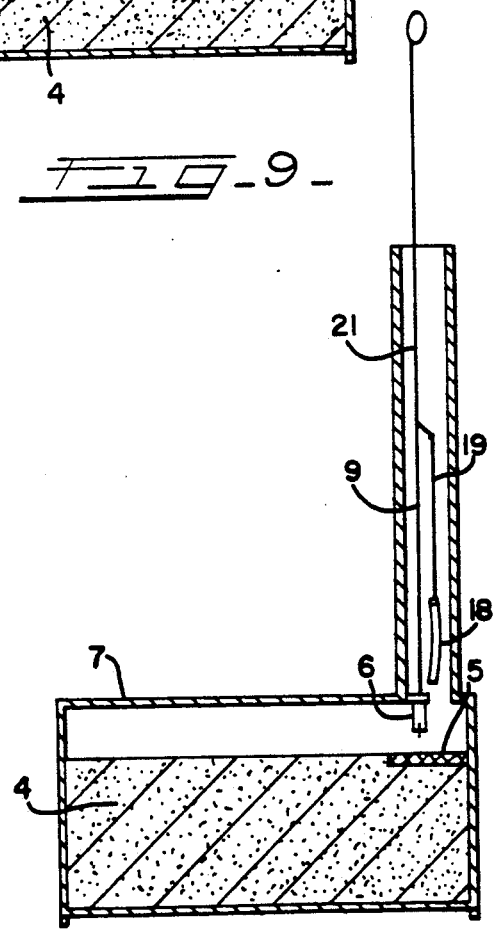

IGNITION MECHANISM FOR A HEATER

FIELD AND BACKGROUND OF THE INVENTION

This invention relates to an ignition device, and in particular, to an ignition device having safety features, for use in an instant heating container for promptly heating water, oil or other liquids, or solids, and which is especially suitable for outdoors use.

Heating means have been provided for use outdoors such as when camping, and as one example, liquid or solid hydrocarbon fuel is commonly used. Regarding special heating means, many are known, and among them there are heaters using the hydration reaction of calcium oxide or aluminum, and heaters using an exothermic substance formed by mixing aluminum powder with silicon powder, as disclosed in Japanese Patent Provisional Publication Showa 52-19358.

However, when using a liquid or solid fuel, in order to reduce the heating time, the device must be made quite large, thereby making it less handy to carry; in addition, use outdoors in a rain or strong wind is usually difficult. Regarding the heating method based on the hydration reaction, although it is more suited for use outdoors, the heating speed is relatively slow, and the amount of calories produced is extremely small in comparison with the weight of the pyrogen. Furthermore, regarding the exothermic substance disclosed in Japanese Patent Provisional Publication Showa 52-19358, given the nature of the pyrogen used, it requires firing by an electric heater or a lighter for a while in order to be ignited; thus the amount of calories needed for ignition is large, and ignition quality is poor.

Taking into consideration the foregoing problems, the present inventors have developed an instant heating device which provides a low-cost method of heating and which generates a large amount of calories and is easy to ignite. This device may be described as an instant heater and includes a pyrogen, which is a mixture of one or more kinds of metal oxide powder and one or more kinds of semi-metal powder; a firing agent which is a mixture of one or more kinds of metal oxide powder and one or more kinds of metal and semi-metal powder, the agent being in contact with the pyrogen and being easier to ignite than the pyrogen; and an igniter which is placed close to the firing agent and is used for igniting the firing agent, by mixing an oxidizing agent such as chlorate, perchlorate or nitrate with an inflammable material, or by sparks from a flint. The pyrogen, firing agent and igniter are stored in a metal container (an outer shell); a small hole or thin tube passes through the wall of the container; a string or thin wire is run from the igniter to the outside of the container through this small hole or thin tube; and ignition is realized by pulling or pushing this string or thin wire from outside of the container, thus heating the firing part and the exothermic part. Japanese Patent Application Showa 63-63524 discloses an arrangement of the foregoing character.

The above-described instant heater has sufficiently satisfied the desired aim, but nevertheless questions have arisen regarding the safety of the ignition device before the desired time of use. Since the exothermic substance which is provided inside the heater reaches fairly high temperatures (1000° C. or more) when heated, if ignited mistakenly when not intended for use, it could be extremely dangerous. Therefore, an ignition device so structured that it could be ignited only when the heater is intended to be used, and which could not be ignited by simply pulling or pushing a string or wire for ignition, is highly desirable.

It is a general object of this invention to provide a highly safe ignition device for instant heaters.

SUMMARY OF THE INVENTION

In accordance with this invention, there is provided an ignition device for an instant heating container, wherein at least one tube but preferably a chimney-like double tube (or two tubes) are attached to a metal exothermic container in which an exothermic part, a firing part and an igniter which is ignited by pulling a string or wire attached to it are stored together; in one side of the double tube or in one of the two tubes is housed the string or wire of the igniter, and the other tube is used as the outlet for discharging the exothermic gas; an inlet for a liquid is provided in the tube used for storing the string or wire and a float is fixed to the free end of said string or wire.

In another embodiment, the invention is further characterized by a chimney-like hollow tube that is attached to a metal exothermic container in which an exothermic part, a firing part and an igniter which is ignited by pulling a string or wire attached to it are stored integrally; on the outside of the hollow tube, the string or wire with a float on its free end is attached with a water-soluble glue.

In addition, the float attached to the free end of the string or wire of the igniter floats upwardly when the liquid, which is the material to be heated, is poured in.

In another embodiment, the invention is still further characterized in that a chimney-like hollow tube is attached to a metal exothermic container in which an exothermic part, a firing part and an igniter which is ignited by pulling a string or wire attached to it are stored together; a cap is fixed with a water-soluble glue to the upper end of the hollow tube; and the free end of the string or wire is connected to either the cap or the upper inner part of the hollow tube.

Further, the string or wire of the igniter cannot be pulled until the cap has become unglued due to the addition of the liquid to be heated, thus making it impossible to mistakenly begin ignition when the container is empty.

In another embodiment, the invention is still further characterized in that a chimney-like double tube or two tubes are attached to a metal exothermic container in which an exothermic part, a firing part and an igniter which is ignited by pulling a string or wire attached to it are stored together; the igniter is stored inside the container at a location which is different from the location for igniting the ignition part; the igniter can be moved to the igniting location by pulling the string or wire of the igniter.

In still another embodiment, the invention is still further characterized in that inside a metal exothermic container in which an exothermic part, a firing part and an igniter or some of the components of an igniter which is ignited by pulling a string or wire attached to it are stored together, and there is provided a partition that can be moved between the firing part and the igniter or some of the components of the igniter.

Still further, even if the string or wire of the igniter is pulled or pushed by mistake, the firing part is not ignited, and even if the igniter is lit by some external cause, the firing part is not ignited, because the ignition mechanism operates in stages to provide extreme safety.

BRIEF DESCRIPTION OF THE DRAWINGS

The invention will be better understood from the following detailed description taken in conjunction with the accompanying figures of the drawings, wherein:

FIGS. 1a and 1b are sectional views of one embodiment of an ignition device in accordance with this invention;

FIG. 2 is a sectional view of another embodiment of the invention;

FIGS. 3a and 3b are views of another embodiment of this invention;

FIGS. 4a and 4b are sectional views of still another embodiment of this invention;

FIG. 5 is a sectional view of still another embodiment of FIG. 4;

FIGS. 6 and 7 are sectional views of still another embodiment of this invention; and FIGS. 8 and 9 are sectional views of still another embodiment of the invention.

DETAILED DESCRIPTION OF THE DRAWINGS

In the embodiments shown in FIGS. 1-3, unless the liquid (water, etc.), which is the material to be heated, has been poured in a container, the igniter cannot be operated.

In FIG. 1, the structure comprises a container 1 that houses the material 2 to be heated (in this case water); an exothermic heater 3 for heating water 2, is installed inside said container 1, and in this example the heater has the character described in Japanese Patent Application Showa 63-63524. In more detail, the heater 3 comprises an exothermic part 4 which is a mixture of metal oxide powder and semi-metal powder; a firing part 5 which is a mixture of metal oxide powder and metal and semi-metal powder, and which is in contact with the exothermic part and is easier to ignite than the exothermic part; and an igniter 6 which is set close to the firing agent and causes a mixture of an oxidizing agent such as chlorate with an inflammable material to fire or a flint to spark by means of friction heat. The exothermic part 4, the firing part 5 and the igniter 6 are housed in a metal container (an outer shell) 7.

On top of the outer shell 7 is attached a double tube 8 and a string (or thin wire) 9 for the igniter 6, which is placed in this double tube 8 so that it can pass through it. When a "string" is referred to herein and in the claims, it will be understood that this term includes both a metal wire and a flexible fabric cord, for example. The double tube includes inner and outer coaxial tubes 8A and 8B. The inner tube 8A of the double tube 8 serves as the gas discharge outlet at the time of heat generation and the outer tube 8B serves to house the string 9 of the igniter, which has a float 10 fixed to its free or upper end. Also, in the outer tube 8B is formed a hole 8C (FIG. 1b) through which water can enter the tube, and an annular plug 11 which prevents the passage of water from the outer tube 8B to the interior of the container 7 is provided below the hole 8C. The string 9 of the igniter passes through this plug 11.

The float 10 on the free end of the string (or wire) of the igniter, which is in the position shown in FIG. 1b when the container 1 is empty, floats up (see FIG. 1a) when the water 2 is poured into the container 1 and enters the outer tube 8B through the hole 8C. When the string 9 connected to this float 10 is manually pulled, the igniter 6 is ignited, the firing part 5 is ignited, and then the exothermic part 4 is ignited to generate heat, which passes through the outer shell 7 to heat the water 2 in the container 1 to the desired temperature. Thus the outer tube 8B contains the string and the inner tube 8A conducts the discharged gas during ignition. The igniter 6 may include, for example, a flint which engages a roughened rotatable wheel, the string being wound around the wheel and causing the wheel to rotate when pulled and create sparks.

If, instead of attaching a double tube (FIGS. 1a and 1b) to the outer shell 7, two separate tubes are attached, one to discharge gas and the other (into which water may infiltrate) to hold the string of the igniter, the same effect may be obtained.

FIG. 2 is an example of using a single hollow tube 13 instead of using a double tube; the string 9 of the igniter 6 passes through the hollow tube 13 and is glued to the outer surface of the tube in position slightly below the top or upper end of the tube. The glue (or adhesive) 10a to be used to hold the string should be an edible type which is water-soluble. Thus, when the water 2 is poured into the container 1, the glue 10a holding the string 9 is dissolved and the float 10 floats upwardly. It is recommended that a plug 12 be mounted in the top of the hollow tube 13.

In FIG. 3a, the free end of the string 9 (or wire) of the igniter 6 is fastened to a cap 14 which is placed over the top of the hollow tube 13; this cap 14 is glued to the hollow tube 13 with water-soluble glue (or adhesive) 10a. As shown in FIG. 3b, there are slits in the edge of the cap 14 to help the glue dissolve, and it may have threads inside it for screwing it onto the tube 13, or a simple resin cap may be used so that it can be promptly removed as soon as the glue has dissolved. In this structure too, as the water is poured into the container, the glue fixing the cap 14 is dissolved. Once the cap has been removed, the string 9 can be pulled, igniting the igniter 6, thereby causing the exothermic part 4 to generate heat. The string 9 may also be fastened to the upper part of the hollow tube 13 with a water soluble glue without being fixed to the cap 14.

In the embodiments shown in FIGS. 4 and 5, a water-soluble glue is not used and the igniter is ignited by pulling the string of the ignition mechanism in a two-step operation.

As shown in FIG. 4a, the exothermic part 4 and the firing part 5 are the same as in the heaters described previously, but this heater is characterized in that the igniter 6 is not positioned close to the firing part 5, but is initially housed at another location inside the metal outer shell 7 where the firing part would not be ignited even if the igniter burned. In this passive position, where ignition is impossible, the igniter 6 is retained inside a metal retention tube 15 attached to the outer shell 7; when the string 9 is pulled, the igniter is moved to another position, the ignition position. FIG. 4b shows the igniter 6 after being moved to the ignition position where it is held by a bracket 15a. In this ignition position, when the string 9 is pulled a second time, the igniter 6 is ignited, igniting the firing part 5 which causes the exothermic part 4 to generate heat.

FIG. 5 shows another embodiment similar to FIG. 4; the lower part of the hollow tube 13 for discharging combustion gas extends into the exothermic part 4 and the igniter 6 is set in that extended part. The original position of the igniter 6 is far below the firing part 5 (solid lines in FIG. 5), and the ignition position is close to the firing part 5; at this ignition position (illustrated in dashed lines) the igniter 6 is held by a bracket 15a; there is a hole 17 in the wall of the tube for the sparks to pass through to the part 5. The effects of this embodiment are the same as that shown in FIG. 4.

FIGS. 6-9 show embodiments in which a movable partition is placed between the firing agent and the igniter or some of the components of the igniter. By some of the components of the igniter is meant, in the case of an igniter using sparks by friction between a flint and hard metal for example, the flint or hard metal, or the thin wire for activating such. The example in FIG. 6 is characterized in that a partition 18 made of aluminum foil, glass fiber or ceramic fiber is placed between the igniter 6 and the firing part 5 to prevent the firing part from burning even if the igniter 6 is activated by mistake.

To ignite, the partition 18 is pulled away from between the igniter 6 and the firing part 5 as shown in FIG. 7 by first pulling a string 19; then, the thin wire 20 is either pulled or pushed (when a stiff wire is used) to activate the igniter, which ignites the firing part.

FIGS. 8 and 9 show another embodiment in which the string 19 to move the partition and the string 9 to activate the igniter are joined to form a single string 21. As shown in FIG. 8, the string 9 is normally hanging loose but is connected to the string 19, and both are combined into the string 21. To ignite, the string 21 is pulled once to pull away the partition 18 from between the igniter and the firing part and then the string is pulled a second time (see FIG. 9) to activate the igniter, which ignites the firing part.

The foregoing is a description of suitable embodiments of this invention based on the drawings, but this invention is not limited in scope to just these examples and may naturally feature other similar embodiments as covered by the scope of the accompanying claims.

Practical examples are described below:

Practical Example No. 1

1) Container and material to be heated
Container: The cylindrical metal container 1 shown in FIG. 1 (70 mm $\Phi \times 150$ mm high)
Material to be heated: 400 ml of water
2) Heater (Structure in FIG. 1)
Exothermic part: Mixture of 70 g of iron oxide ($Fe_2O_3$) powder and 30 g of ferrosilicon (75% silicon and 25% iron) powder.
Firing part: 0.5 g of firing agent composed of oxidizing agent, mainly aluminum powder (15%), boron (3%) and barium peroxide, and a small amount of copper oxide and strontium peroxide.
Igniter: 0.01 g of a mixture of red phosphorous and potassium chlorate wrapped in Japanese paper.
Metal outer shell 7: 0.5 mm-thick tin, 60 mm $\Phi \times 40$ mm high.
Double tube: 100 mm high, outer tube 12 mm $\Phi$, inner tube 4 mm $\Phi$; hole 50 mm from the top of the outer shell.
3) Results
When water was poured into the container, the float immediately floated upwardly, and when the string was pulled the firing part and the exothermic part were ignited. 10° C. water was heated to 100° C. in 2 minutes.

Practical Example No. 2

1) Container and material to be heated
The same as those in Practical Example 1.
2) Heater (Structure in FIG. 3)
The exothermic part, firing part, igniter and outer shell of the exothermic part were the same as in Practical Example 1.
Hollow tube: 5 mm $\Phi \times 100$ mm high
Glue: Starch
3) Results
When water was poured into the container, the cap could be removed after about 5 seconds, and when the string of the igniter was pulled, the firing part and the exothermic part were ignited. The water was heated to 100° C. in 2 minutes.

Practical Example No. 3

1) Container and material to be heated
The same as those in Practical Example 1.
2) Heater (Structure in FIG. 4)
The exothermic part, firing part, igniter and outer shell of the exothermic part were the same as in Practical Example 1.
Hollow tube: 5 mm $\Phi \times 100$ mm high
Retention tube: 30 mm from left end of hollow tube; 3 mm $\Phi \times 10$ mm high
3) Results
The ignition device was not ignited when the string of the ignition part was pulled once. After the string was pulled again, the igniter was activated, igniting the firing part and the exothermic part. The water was heated to 100° C. in 2 minutes.

Practical Example No. 4

1) Container and material to be heated
The same as those in Practical Example 1.
2) Heater (Structure in FIG. 6)
The exothermic part, firing part, igniter and outer shell of the exothermic part were the same as in Practical Example 1. The igniter consisted of the combination of a round flint and a hard metal.
Hollow tube: 5 mm $\Phi \times 100$ mm high.
Partition: 20 mm $\Phi \times 0.5$ mm thick ceramic fiber fabric.
3) Results
First, the partition was removed from between the igniter and the firing part by pulling the string connected to the partition, the flint and striker were activated by pushing the thin wire (bar) connected to the flint, and the firing part was ignited, heating the exothermic part. The water was heated to 100° C. in 2 minutes.

Apparatus in accordance with this invention shown in FIGS. 1 to 3 is highly advantageous because ignition can only be achieved after introduction of the liquid, which is the material to be heated; there is no danger of ignition by mistake when the container is empty, making this device extremely safe.

According to the ignition device shown in FIGS. 4 to 9 of this invention, ignition cannot be achieved by just pulling the string of the ignition device once, and the firing part is not ignited even if the igniter is activated for some reason; thus, the safety of these devices is high too.

As explained above, the heater provided with the ignition device according to this invention can only be lit at the time of its intended use and heat is generated by the firing part and the exothermic part. In addition, it can be used anywhere and the material to be heated can be heated in a short time. Furthermore, it is compact and easy to carry.

What is claimed is:

1. An ignition mechanism for a heater which includes a metal exothermic container in which are mounted an exothermic part, a firing part and an igniter, said mechanism comprising a tube mounted on said container, said tube having one end for positioning adjacent the igniter, a string which is connectable to said igniter and which extends into said tube, said string being extendable to the other end of said tube to operate said igniter, and further including safety means connected to said string for preventing accidental operation of said igniter.

2. A mechanism as set forth in claim 1, wherein the other end of said tube extends upwardly from said igniter, said string is flexible and normally adjacent said igniter and said safety means includes the flexibility of said string and a float attached to said string.

3. A mechanism as set forth in claim 2, wherein said float is located in said tube, and said tube has an opening therein for the entry of liquid into said tube, and further including means in said tube for preventing the liquid from reaching said igniter.

4. A mechanism as set forth in claim 1, wherein said safety means includes a cap which is attached to said tube and to said string.

5. A mechanism as set forth in claim 1, wherein said tube is further adapted to discharge exothermic gas.

6. A mechanism as set forth in claim 1, and further including a second tube for carrying exothermic gas.

7. A mechanism as set forth in claim 6, wherein one said tubes is mounted within the other of said tubes.

8. A mechanism as set forth in claim 1, wherein said safety means includes a removable cover for covering the firing part, said string further being attached to said cover.

9. An ignition mechanism for a heater which includes a metal exothermic container in which are mounted an exothermic part, a firing part and an igniter, said mechanism comprising a tube mounted on said container, said tube having one end for positioning adjacent the igniter, a string which is connectable to said igniter and which extends into said tube, said string being extendable to the other end of said tube to operate said igniter, and further including safety means connected to said string for preventing accidental operation of said igniter, said safety means including a water soluble glue holding said string.

10. A mechanism as set forth in claim 9, wherein said glue is between said string and the exterior of said tube.

11. An ignition mechanism for a heater which includes a metal exothermic container in which are mounted an exothermic part, a firing part and an igniter, said mechanism comprising a tube mounted on said container, said tube having one end for positioning adjacent the igniter, a string which is connectable to said igniter and which extends into said tube, said string being extendable to the other end of said tube to operate said igniter, and further including safety means connected to said string for preventing accidental operation of said igniter, and further comprising a cap placed over the top of said tube and glued to said tube with water-soluble glue, the free end of said string being fastened to said cap.

12. An ignition mechanism for a heater which includes a metal exothermic container in which are mounted an exothermic part, a firing part and an igniter, said mechanism comprising a tube mounted on said container, said tube having one end for positioning adjacent the igniter, a string which is connectable to said igniter and which extends into said tube, said string being extendable to the other end of said tube to operate said igniter, and further including safety means connected to said string for preventing accidental operation of said igniter, said safety means including holding means for storing the igniter at a position displaced from the firing part, said string moving said igniter from said holding means to a position adjacent said firing part.

13. An ignition mechanism for a heater which includes a metal exothermic container in which are mounted an exothermic part, a firing part and an igniter, said mechanism comprising a tube mounted on said container, said tube having one end for positioning adjacent the igniter, a string which is connectable to said igniter and which extends into said tube, said string being extendable to the other end of said tube to operate said igniter, and further including safety means connected to said string for preventing accidental operation of said igniter, said safety means including a cover adapted to cover the firing part, and a second string attached to said cover and extending through said tube.

14. A heater comprising a metal exothermic container in which are mounted an exothermic part, a first part and an igniter, a tube mounted on the container, said tube having one end positioned adjacent said igniter, a string connected to said igniter and which extends into said tube, said string being extendable to the other end of said tube, whereby said string may be manually moved and thereby operate said igniter, and safety means connected to said string for preventing unintended operation of said igniter.

* * * * *